Figures 1, 2, 3, 4, 5, 6, 7, 8, 9, 10, 11:
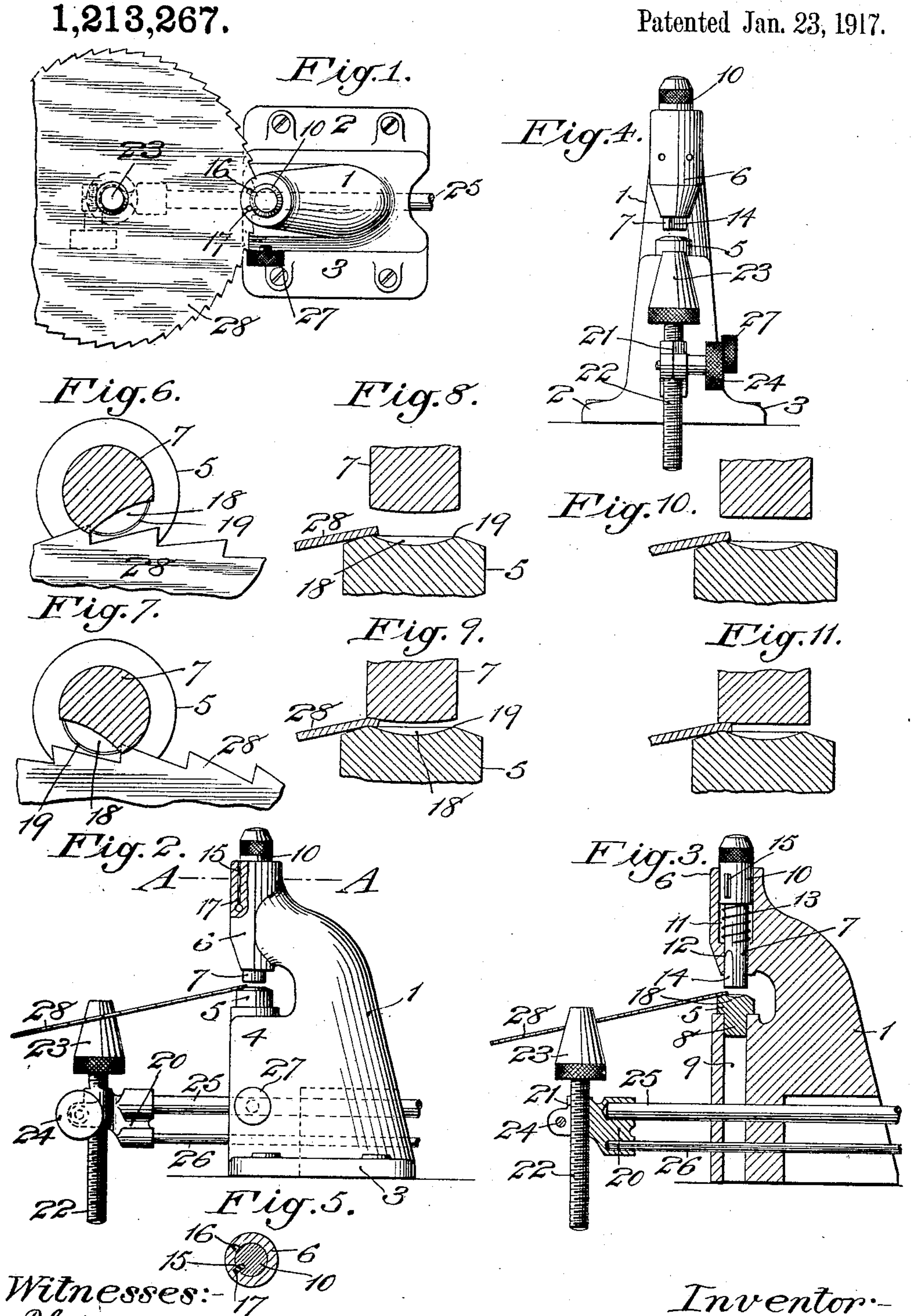

V. ROYLE.

SAW SETTING APPARATUS.

APPLICATION FILED SEPT. 25, 1914.

1,213,267. Patented Jan. 23, 1917.

Witnesses:-
Hyperion Barry
F. George Barry.

Inventor-
Vernon Royle
by his attorneys
Brown Seward

THE NORRIS PETERS CO., PHOTO LITHO., WASHINGTON, D. C.

UNITED STATES PATENT OFFICE.

VERNON ROYLE, OF PATERSON, NEW JERSEY.

SAW-SETTING APPARATUS.

1,213,267. Specification of Letters Patent. Patented Jan. 23, 1917.

Application filed September 25, 1914. Serial No. 863,494.

*To all whom it may concern:*

Be it known that I, VERNON ROYLE, a citizen of the United States, and resident of Paterson, in the county of Passaic and State of New Jersey, have invented a new and useful Improvement in Saw-Setting Apparatus, of which the following is a specification.

My invention relates to saw setting apparatus with the object in view of providing simple and effective means for setting saw teeth without deforming the teeth.

A practical embodiment of the invention is represented in the accompanying drawings in which, Figure 1 is a top plan view of the apparatus, showing a portion of a circular saw in the position which the saw assumes when its teeth are being set. Fig. 2 is a view of the same in side elevation partly in section. Fig. 3 is a vertical central section from front to rear. Fig. 4 is a view in front elevation with saw removed. Fig. 5 is a horizontal section in the plane of the line A—A of Fig. 2. Fig. 6 is an enlarged view in detail in horizontal section, showing the position of the setting tool with respect to a tooth for setting alternate teeth of the saw in the same direction. Fig. 7 is a similar view, showing the position of the saw setting tool for setting alternate teeth of the saw in the opposite direction. Fig. 8 is an enlarged view in detail in vertical section, showing the position of the saw setting tool, the anvil and the saw tooth before the tool comes in contact with the tooth. Fig. 9 is a similar view, showing the position of the parts after the saw setting tool has come into engagement with the tooth. Fig. 10 is a view corresponding to Fig. 8, showing the saw setting tool modified by having a flat operating end as distinguished from a convex end, and Fig. 11 is a view corresponding to Fig. 9, with the modified form of saw setting tool above noted.

The frame of the apparatus consists of a casting 1, provided with flanges 2 and 3 at its base, through which bolts may conveniently pass for securing the frame to a bench or other support. The casting 1 is formed with a lower jaw 4 in which the anvil 5 is supported, and with an over-hanging jaw 6 in which the saw setting tool 7 is supported. The anvil 5, as clearly shown in Fig. 3, is conveniently provided with a stem 8 which enters a perforation 9, the anvil 5 resting on the surface of the jaw immediately surrounding the perforation 9.

The saw setting tool 7 has its upper portion 10 enlarged to fit with an easy sliding movement the enlarged bore 11 in the upper jaw 6 of the frame, the lower portion of the tool 7 extending down through a smaller perforation 12 in the jaw 6, into position over the anvil 5. The tool 7 is held normally in a retracted or raised position by means of a coil spring 13 seated between the bottom of the enlarged bore 11 and the lower end of the enlarged portion 10 of the tool.

The operating end of the tool 7 is flattened or cut away for a distance back from its operating face, as shown at 14, for causing it to clear a saw tooth adjacent to the tooth being operated upon. The enlarged upper end of the tool 7 is further provided with a guide 15, projecting from its wall, which guide slides up and down in one or the other of the two grooves 16, 17, formed in the inner surface of the overhanging jaw 6. These grooves 16, 17, are placed at such a distance apart as to accurately locate the tool in position for setting the alternate teeth of the saw either to the right or left as the case may be.

The lower end of the tool 7 may be either slightly convex, as shown in the enlarged detail Figs. 8 and 9, the preferred form, or it may be flat, as shown in Figs. 10 and 11, the modified form.

The anvil 5 has in its top a concave depression 18, and surrounding this concave depression is a wall having a slight upward inclination, thereby forming a pronounced blunt edge 19, over which the tooth of the saw is bent.

For holding a circular saw in position to have its teeth set, there is provided a bracket 20, having a split screw-threaded socket 21, in which the screw-threaded stem 22 of a conical support 23 is held, the walls of the socket 21 being conveniently drawn together by a screw 24 to lock the support 23 at the desired elevation. The bracket 20 is supported by means of rods 25, 26, which have a horizontally sliding movement in suitable perforations in the frame 1, and are conveniently locked in their sliding adjustment out and in by means of a set screw 27. The conical shaped support 23 provides for saws having different sized central holes and the sliding of the bracket 20 toward and away from the frame 1, provides for locking saws of different diameters with their teeth in position to be operated upon.

In operation, a saw, denoted by 28, having been placed in position on the support 23 and the support adjusted to bring the saw blade into the proper position on the anvil with the tooth projecting over the blunt edge 19 of the anvil, the setting tool is struck by the operator, bringing it into contact with the saw tooth and bending the latter down into the concave portion 18 of the anvil, giving it the set desired. When every other tooth has been set, the saw may be reversed on its support, the saw setting tool swinging into the position shown in Fig. 7, and each alternate tooth not previously set may be set in the opposite direction.

The concavity in the top of the anvil provides for the bending of the saw tooth without deforming it by thinning it at the outer edge, an objection heretofore common since the degree of concavity of the face of the anvil is, as shown, greater than the degree of convexity of the lower end of the setting tool, and the blunt edge 19 of the anvil with the accurate location of the saw on its support coöperates to form the bend in each tooth at the same distance from the point of the tooth.

The apparatus as a whole is simple and durable and can be quickly manipulated to adjust itself to suit saws of varying diameters to be operated upon.

What I claim is:

1. In saw setting apparatus, the combination with a saw setting tool, of an anvil provided with a concave face surrounded by a bearing surface on which the tooth to be set is intended to rest.

2. In saw setting apparatus, the combination with means for supporting the saw in position to be set, of a saw setting tool provided with a convex lower end and an anvil having a concave face, the concavity of the anvil face being greater than the convexity of the lower end of the setting tool.

3. In saw setting apparatus, an anvil, a saw setting tool, a saw centering device, a main supporting element and a bracket in which the saw centering device has a vertical adjustment, the said bracket having a support constructed to slide horizontally in the main supporting element.

In testimony, that I claim the foregoing as my invention I have signed my name in presence of two witnesses, this nineteenth day of September, 1914.

VERNON ROYLE.

Witnesses:
F. J. Bradley,
W. B. Murphy.

Copies of this patent may be obtained for five cents each, by addressing the "Commissioner of Patents. Washington, D. C."